J. S. HOWELL & C. W. CARTER.
LOZENGE MACHINE.
No. 65,575.                             Patented June 11, 1867.
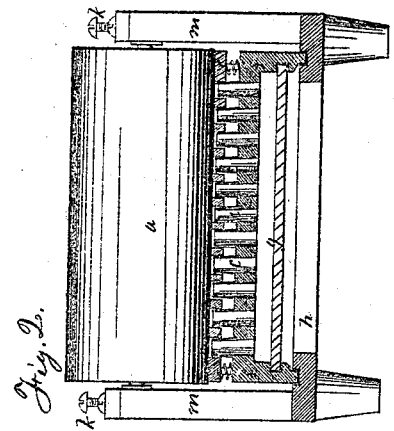
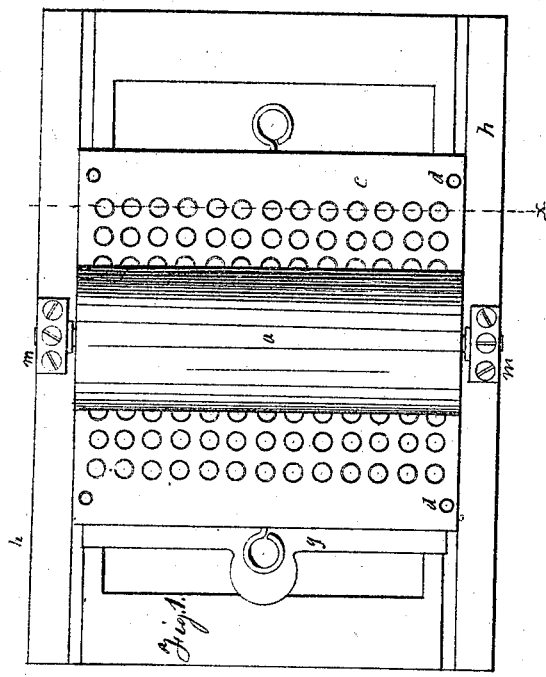
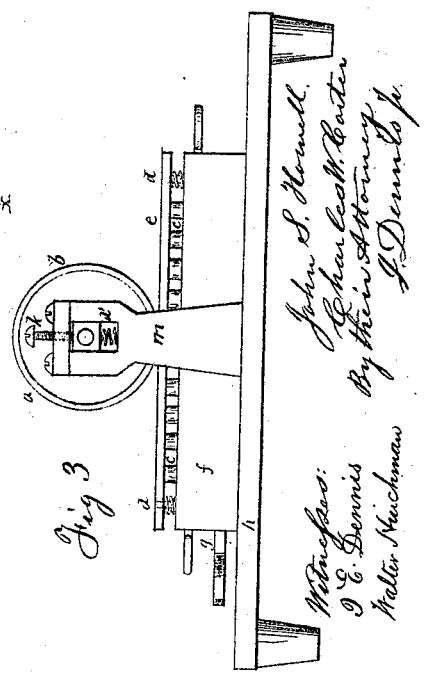

United States Patent Office

JOHN S. HOWELL AND CHARLES W. CARTER, OF PORTSMOUTH, NEW HAMPSHIRE.

Letters Patent No. 65,575, dated June 11, 1867.

IMPROVED LOZENGE MACHINE.

The Schedule referred to in these Letters Patent and making part of the same.

TO ALL WHOM IT MAY CONCERN:

Be it known that we, JOHN S. HOWELL and CHARLES W. CARTER, both of Portsmouth, in the county of Rockingham, and State of New Hampshire, have invented certain new and useful improvements in Machines for Cutting Lozenges, Confectionery, Crackers, etc.; and we do hereby declare that the same are described and represented in the following specifications and drawings.

To enable others skilled in the art to make and use our improvements, we will proceed to describe their construction and operation, referring to the drawings, in which the same letters indicate like parts in each of the figures.

The nature of our invention consists in the particular combination and arrangement of a roller and traversing carriage working under it and carrying the cutters, clearing-board, and receiving-board which receives the lozenges after they are cut, and upon which they may be dried. In the accompanying drawings—

Figure 1 is a plan or top view.

Figure 2, a section of fig. 1 cut perpendicularly through the line $x$ $x$.

Figure 3 is an elevation of one side.

In these drawings, $h$ $h$ is an oblong rectangular frame, the longest sides being grooved for ways for the ribs on the under side of the carriage $f$ $f$ to traverse in, which carriage is oblong and rectangular in form, with its two longest sides projecting down to form flanges, which terminate in ribs which run in the ways in the frame. This carriage is made of cast iron, and perforated with many holes for the cutters $c$ $c$, which are fitted to the holes and made to project a proper distance above the carriage. The top surface and the holes in the carriage are coated with tin or solder, and the tubes or cutters put in when the plate is heated, so as to melt the solder and secure the cutters all firmly in the platen or carriage. $e$ is a clearing-board or plate, with holes in it corresponding with the cutters, so that it will slip down around all the cutters, which project up through it. There are several guide pins, $d$ $d$, in the carriage which fit corresponding holes in the clearing-board, and there are some spiral springs around these pins which hold the top of the board a little above the cutters to receive the sheet of lozenge dough laid on the board. The flanges of the carriage are fitted to receive and carry the receiving-board $g$, upon which the lozenges fall as they pass through the cutters, which are made gradually larger on the inside from the top to the bottom, to facilitate the lozenges in falling freely to the receiving-board after they are cut. The stands $m$ $m$ are fastened to the frame $h$ to support the journal-boxes of the roller $a$, which are fitted to traverse in the stands, and are held up by the spiral springs $d'$ $d'$, and are pressed down by the springs $k$ $k$, to adjust the roller to the tops of the cutters. This roller $a$ may be made of wood or other material, and covered with sheet rubber, $b$, or leather, or some substance which will press the dough through the cutters without injuring the edges of the cutters.

This machine is operated by running the carriage from under the roller and spreading a sheet of dough on the clearing-board $e$, and then running the carriage under the roller $a$, which presses down the dough and clearing-board, forcing the dough on to the cutters, which cut the lozenges very smooth, and they fall from the cutters to the receiving-board $g$, where they are all deposited separately in fine order to dry, and the board $g$ may be drawn from the carriage and put in a rack to dry and harden. The scraps which remain on the clearing-board may be removed, when it is ready to receive another sheet of dough and another receiving-board to repeat the operation.

The lozenges cut by this machine are far smoother and appear much better than those cut by hand, and the cutters may be made in any form desired. The carriage may be traversed by hand or by a rack and pinion, and operated by steam or other power to cut five hundred pounds per day, which is more than six times the quantity cut by hand without the machine. The carriage may be connected by a link to a crank to traverse it if preferred that way.

We claim the combination and the arrangement of the roller $a$, and the traversing carriage $f$, carrying the cutters $c$ $c$, clearing-board $e$, and receiving-board $g$, all combined for joint operation, substantially as set forth.

JOHN S. HOWELL,
CHAS. W. CARTER.

Witnesses:
J. DENNIS, Jr.,
EDM. F. BROWN.